United States Patent [19]

Takaya et al.

[11] Patent Number: 5,630,116
[45] Date of Patent: May 13, 1997

[54] AUTOMATIC DELIVERY SYSTEM FOR MASTER FILES IN A DISTRIBUTED PROCESSING SYSTEM

[75] Inventors: Masahiro Takaya, Tokyo; Hiroko Tsuji, Fukuoka, both of Japan

[73] Assignee: NEC Corporation, Tokyo, Japan

[21] Appl. No.: 279,885

[22] Filed: Jul. 26, 1994

[30] Foreign Application Priority Data

Aug. 11, 1993 [JP] Japan .................................. 5-199399

[51] Int. Cl.$^6$ .................................................. G06F 17/30
[52] U.S. Cl. ............... 395/617; 395/200.03; 364/DIG. 1; 364/283.1
[58] Field of Search ............................... 395/600, 200.03

[56] References Cited

U.S. PATENT DOCUMENTS 5,113,519  5/1992  Johnson et al. ......................... 395/600
5,151,989  9/1992  Johnson et al. ......................... 395/600
5,327,560  7/1994  Hirata et al. ............................ 395/700
5,388,255  2/1995  Pytlik et al. ............................ 395/600

FOREIGN PATENT DOCUMENTS

63-245741  10/1988  Japan.

*Primary Examiner*—Thomas G. Black
*Assistant Examiner*—Jack M. Choules
*Attorney, Agent, or Firm*—Young & Thompson

[57] ABSTRACT

A parent workstation 1 has a master file updating section 4 for updating master files 7, a delivery start notifying section 5 for forwarding the directory list of the master files 7 to a child work-station, and a master delivery section 6 for forwarding data or information requested by the child work-station; and the child workstation has a slave file updating section 11 for updating slave files 14, an updated asset registering section 12 for forwarding updated data or information to the master files 7, and a slave delivery section 13 for comparing the contents of the directory list of the master files 7 and those of the directory list of the slave files 14, and requesting the parent workstation 1 to forward the data or information which is found different.

3 Claims, 5 Drawing Sheets

AUTOMATIC DELIVERY SYSTEM FOR MASTER FILES IN A DISTRIBUTED PROCESSING SYSTEM

BACKGROUND OF THE INVENTION

1. Field of the Invention

This invention relates to an automatic delivery system for master files in a distributed processing system in which master files under management by a parent workstation are delivered to child workstations subordinate thereto.

2. Description of the Related Art

A distributed development support system for distributed development of programs using a plurality of terminal units and centralized data management by a host unit is disclosed in Japanese Kokai No. 1988-245741. In such a system, when data is newly created or updated, i.e., added, altered and/or deleted, at a terminal unit, the data of that terminal unit and data under centralized management by the host unit are automatically updated.

In this system, however, data of no other terminal unit is automatically updated. For this reason, there is a problem in that, when data is to be made identical among terminals units, the user has to remember the updating history, and manually perform the processing to transfer data from all the terminal units whose data has to be updated.

SUMMARY AND OBJECTS OF THE INVENTION

An object of the invention, therefore, is to provide an automatic delivery system for master files in a distributed processing system, capable of improving the reliability of the environment of program development.

Another object of the invention is to provide an automatic delivery system for master files in a distributed processing system, capable of always maintaining identical the contents of master files the parent workstation is provided with, and those slave files the child workstations are provided with and enabling the user of any child workstation to use it without being conscious of the updating history of slave files.

Still another object of the invention is to provide an automatic delivery system for master files in a distributed processing system, capable of transferring only newly registered or updated contents from master files to slave files and thereby achieving a higher efficiency of line utilization.

A first embodiment of an automatic delivery system for master files in a distributed processing system has the following configuration:

An automatic delivery system for master files in a distributed processing system in which distributed processing is executed by a parent workstation provided with master files for storing data or information to be shared by the whole distributed processing system; child workstations connected by communication lines to the parent workstation and provided with slave files for storing data or information acquired from the master files; and grandchild workstations, connected by communication lines to the child workstations, for utilizing data or information in the slave files to execute business processing, is characterized in that:

The parent workstation is provided with a master file updating section, a delivery start notifying section, and a master delivery section. The master file updating section updates the master files with data or information forwarded from the child workstation. The delivery start notifying section forwards the directory lists of the master files to the child workstations. The master delivery section takes out from the master files, and forwards, data or information requested by the child workstation. Each of the child workstations is provided with a slave file updating section, an updated asset registering section, and a slave delivery section. The slave file updating section then updates the slave files. The updated asset registering section forwards to the parent workstation data or information in the slave files updated by the slave file updating section; and the slave delivery section compares the contents of the directory list of the master files forwarded by the parent workstation with those of the directory lists of the slave files, requests the parent workstation to forward the data or information in the master files which is found different, and instructs the slave file updating section to update the slave files with the data or information received in response to the request.

The second embodiment of an automatic delivery system for master files in a distributed processing system has the following configuration:

An automatic delivery system for master files in a distributed processing system in which distributed processing is executed by a parent workstation provided with master files for storing data or information to be shared by the whole distributed processing system; child workstations connected by communication lines to the parent workstation and provided with slave files for storing data or information acquired from the master files; and grandchild workstations, connected by communication lines to the child workstations, for utilizing data or information in the slave files to execute business processing, is characterized in that the parent workstation is provided with a master file updating section, an operation setting file, a group list file, a master list file, a delivery start notifying section, and a master delivery section. The master file updating section updates the master files with data or information forwarded from the child workstation. The operation setting file includes the points of time at which directory information in the master files is to be forwarded to any child workstation. The group list file includes information on connection between the parent workstation and the child workstation. The directory list of said master files is saved into the master list files. The delivery start notifying section forwards the directory list of the master files stored in the master list file to one, designated in the group list file, of the child workstations at a point of time designated in the operation setting file. The master delivery section takes out from the master files, and forwards, data or information requested by the child workstation. Each of the child workstations is provided with a slave file updating section, an updated asset registering section, a master list file, a slave list file, a difference list file, and a slave delivery section. The slave file updating section updates the slave files. The updated asset registering section forwards to the parent workstation data or information in the slave files updated by the slave file updating section. The directory list of the master files forwarded from the parent workstation is saved into the master list file. The directory list of the child workstation's own slave files is saved into the slave list file; and the slave delivery section compares the contents of the directory list of the master files forwarded by the parent workstation with those of the slave list file, saves the name of any master file which is found different into the difference list file, requests the parent workstation to forward the data or information in this different master file, and instructs the slave file updating section to update the slave files with the data or information received in response to the request.

The third embodiment in combination with the second embodiment has the following configurations:

At least the names of files and the number of versions are stored in the master list file and the slave list files as directory lists.

BRIEF DESCRIPTION OF THE DRAWINGS

The above-mentioned and other objects, features and advantages of the invention will become more apparent from the following detailed description when taken in conjunction with the accompanying drawings, wherein.

In the drawings, the same reference numerals denote respectively the same constituent elements.

DETAILED DESCRIPTION OF PREFERRED EMBODIMENTS

Next, the invention will be described in detail with reference to the drawings.

Figure 1:
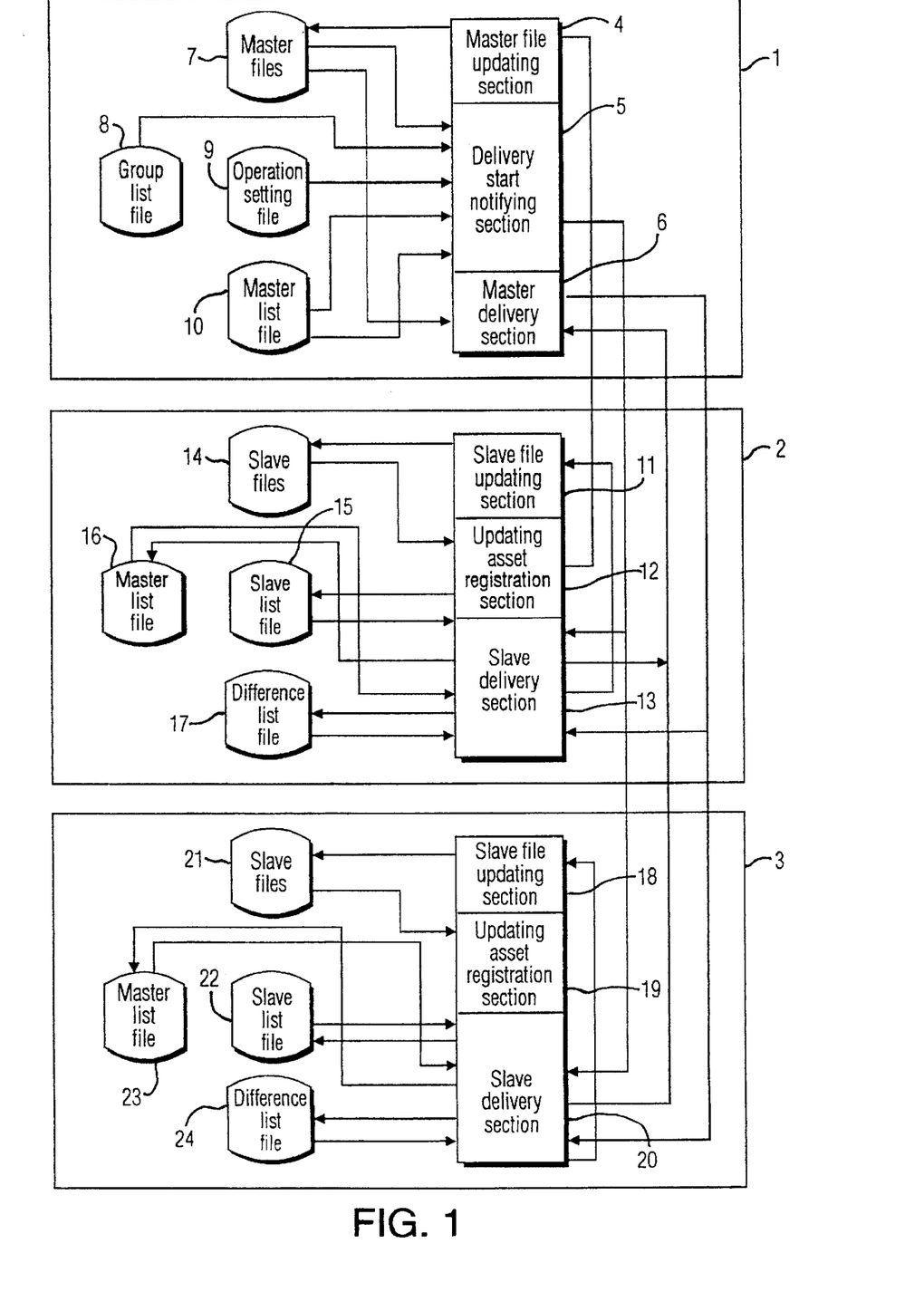
FIG. 1 is a block diagram of an embodiment of the invention.
Figure 2:
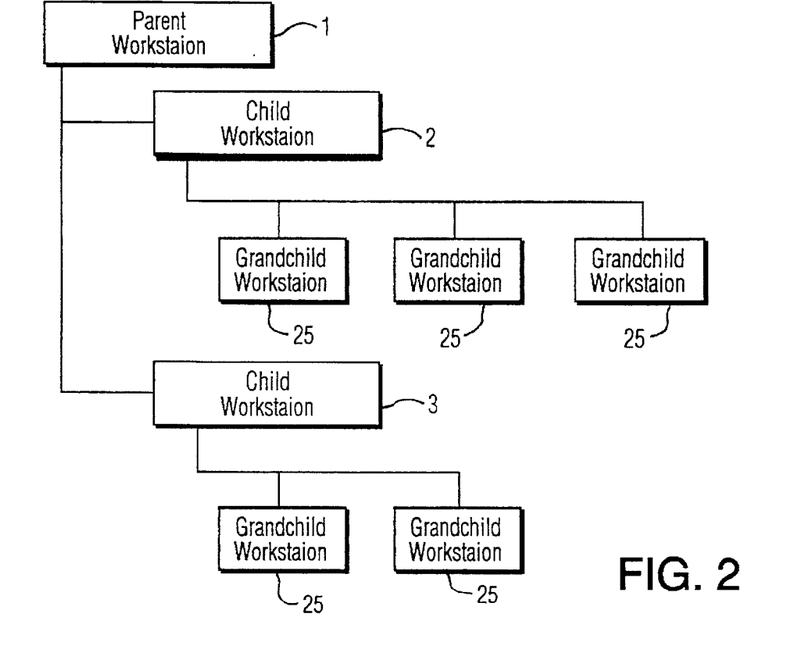
FIG. 2 is a diagram illustrating the connection of workstations in a distributed processing system according to an embodiment of the invention.

Referring to FIGS. 1 and 2, an automatic delivery system for master files in a distributed processing system, which is the first preferred embodiment of the present invention, comprises a parent workstation 1 provided with master files 7 for storing data or information to be shared by the whole distributed processing system; a child workstation 2 connected by communication lines to the parent workstation 1 and provided with slave files 14 for storing data or information acquired from the master files 7; a child workstation 3 provided with slave files 21 for storing data or information acquired from the master files 7; and grandchild workstations 25, connected by communication lines to the child workstations 2 and 3, for utilizing data or information in the slave files 14 and 21 to execute business processing.

Referring now to FIG. 1, the parent workstation 1 has master files 7 for storing data or information to be shared by the whole distributed processing system; a master file updating program (hereinafter called the master file updating section) 4, which is a program to update or register data or information, forwarded from child workstations, into the master files 7; an operation setting file 9 including delivery times, which are the points of time at which directory information in the master files 7 is to be forwarded to any child workstation; a group list file 8 including information on connection between the parent workstation 1 and the child workstations; a master list file 10 for storing the directory list of the master files 7; a delivery start notifying program (hereinafter called the delivery start notifying section) 5, which is a program to forward the directory list of the master files 7 stored in the master list file 10 to one, designated in the group list file 8, of the child workstations at a point of time designated in the operation setting file 9; and a master delivery program (hereinafter called the master delivery section) 6, which is a program to take out from the master files 7, and to forward, data or information requested by child workstations.

The child workstation 2 has slave files 14 for storing data or information in the master files 7, forwarded from the parent workstation 1; a slave file updating program (hereinafter called the slave file updating section) 11, which is a program to update the slave files 14; an updated asset registering program (hereinafter called the updated asset registering section) 12, which is a program to transfer to the parent workstation 1 data or information in the slaves files 14 updated by the slave file updating section 11; a master list file 16 for storing the directory list of the master files 7 forwarded from the parent workstation 1; a slave list file 15 for storing the directory list of the child workstation 2's own slave files 14; and a slave delivery program (hereinafter called the slave delivery section) 13 for comparing the contents of the master list file 16 with those of the slave list file 15, saving the name of any master file which is found to be different into a difference list file 17, requesting the parent workstation 1 to forward the data or information in this different master file, and instructing the slave file updating section 11 to update the slave file 14 with the data or information received in response to the request.

Similarly, the child workstation 3 has a slave file 21, a slave file updating section 18, an updated asset registering section 19, a master list file 23, a slave list file 22, a difference list file 24, and a slave delivery section 20.

In the master list files 10, 16 and 23 and the slave list files 15 and 22 are stored at least the names of files and the number of versions as directory lists.

Next will be described the automatic delivery system for master files in a distributed processing system, which is the first preferred embodiment of the present invention, with reference to FIGS. 1 through 6.

Figures 3A, 3B, 3C:
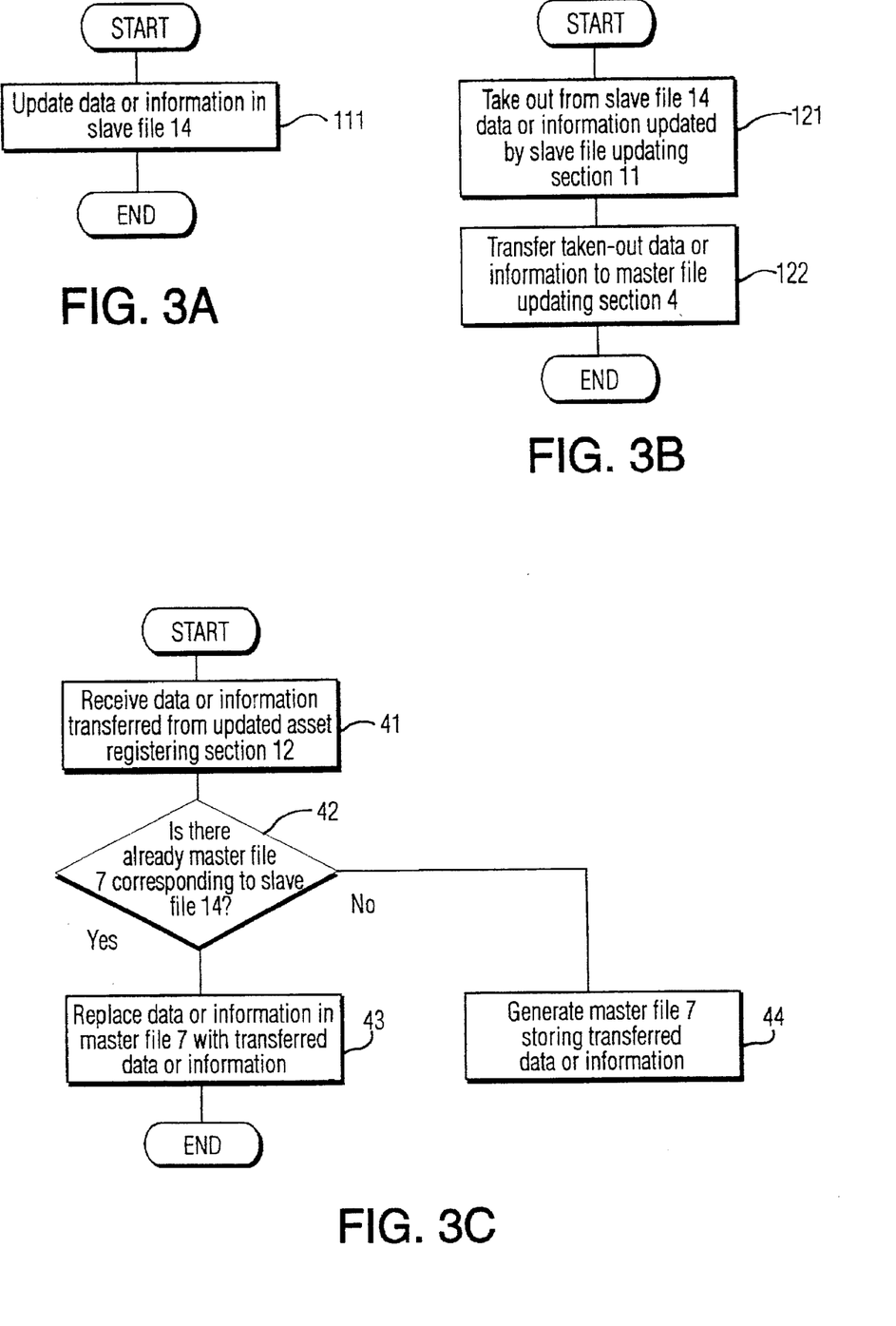
FIGS. 3A–3C are flow charts showing the processing by the slave file updating section 11, the updated asset registering section 12 and the master file updating section 4 according to an embodiment of the invention.

First is a description of the processing to register updated data or information in a slave file 14 of the child workstation 2 into a master file with reference to FIGS. 3A–3C.

The user of the child workstation 2 or of a grandchild workstation 25 executes any desired processing by utilizing data or information stored in the slave file 14.

The slave file updating section 11, as a result of the processing at the child workstation 2 or the grandchild workstation 25 updates the data or information in the slave file 14 (step 111).

Upon updating of the data or information in the slave file 14 by the slave file updating section 11, the updated asset registering section 12 takes out the data or information from the slave file 14 (step 121), and transfers it to the master file updating section 4 (step 122).

The master file updating section 4 receives the data or information transferred from the updated asset registering section 12 (step 41), judges whether or not a master file 7 corresponding to the slave file 14 already exists (step 42) and, if one does, replaces the data or information in the master file 7 with the data or information transferred from the updated asset registering section 12 or, if none does, generates a master file 7 in which the data or information transferred from the updated asset registering section 12 is stored (step 44). As file information including the number of file versions is updated in the processing to update the file at step 43 as in a commonplace procedure of file management, no detailed description of this processing will be made with respect to this embodiment.

Figure 4:
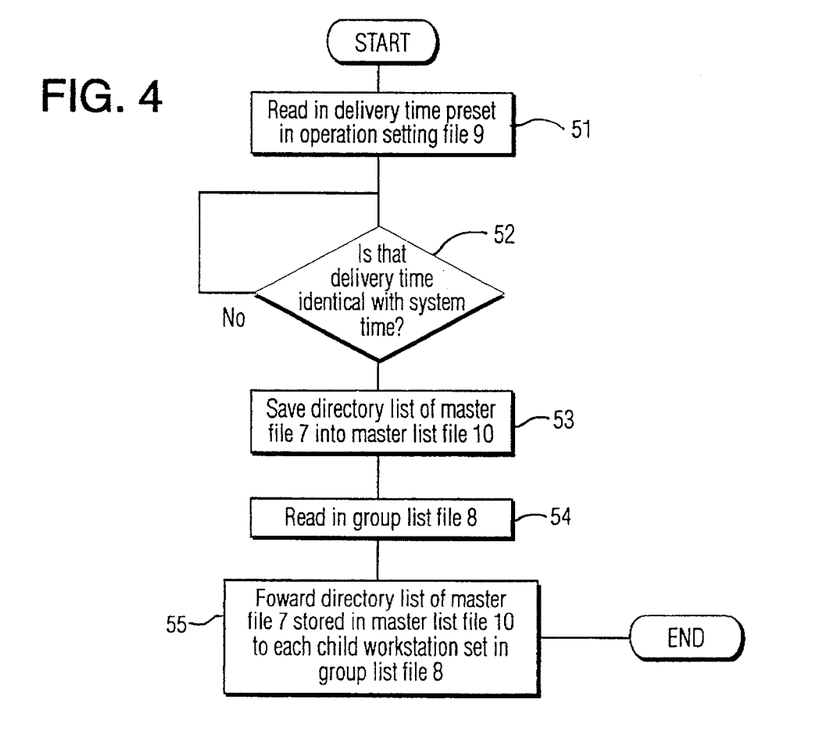
FIG. 4 is a flow chart showing the processing by the delivery start notifying section 5 according to an embodiment of the invention.

Next will be described the processing to forward a directory list stored in the master list file 10 of the parent workstation 1 to the group of child workstations with reference to FIG. 4.

The delivery start notifying section 5 of the parent workstation 1 reads in a delivery time preset in the operation setting file 9 as the point of time at which directory information in a master file 7 is to be forwarded to child workstations (step 51), and compares that delivery time and the system time held by the computer system (step 52). The delivery start notifying section 5, if the two times are not found identical at step 52, again performs step 52 after the lapse of a certain length of time.

The delivery start notifying sections 5, if the two times are found identical at step 52, saves the directory list of the master file 7 into the master list file 10 (step 53).

Then, the delivery start notifying section 5 reads in the group list file 8 in which information on the group of child workstations connected to the parent workstation 1 is preset (step 54), and forwards the directory list of the master file 7 stored in the master list file 10 to each of the child workstations set in this group list file 8 (step 55).

Next will be described the processing to update the slave file of a child workstation to make its contents identical with those of the corresponding master file of the parent workstation with reference to FIGS. 5A, 5B and 6A–6C.

Figure 5A:
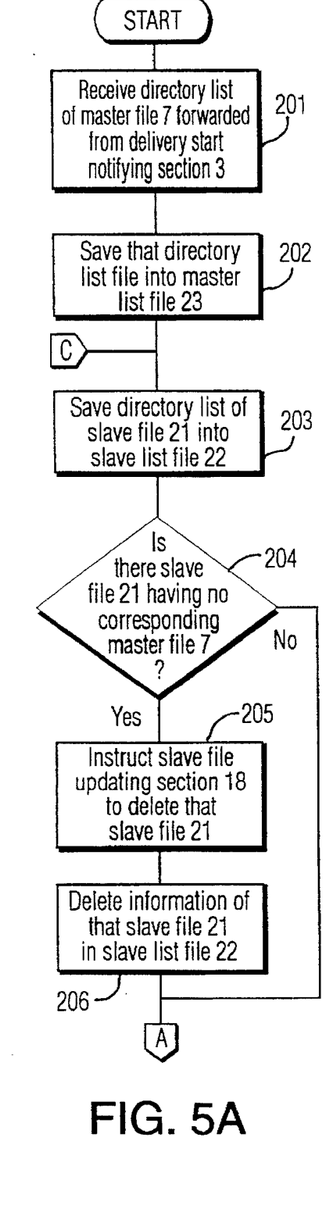
FIGS. 5A–5B are flow charts showing the processing by the slave delivery section 20 according to an embodiment of the invention.
Figure 5B:
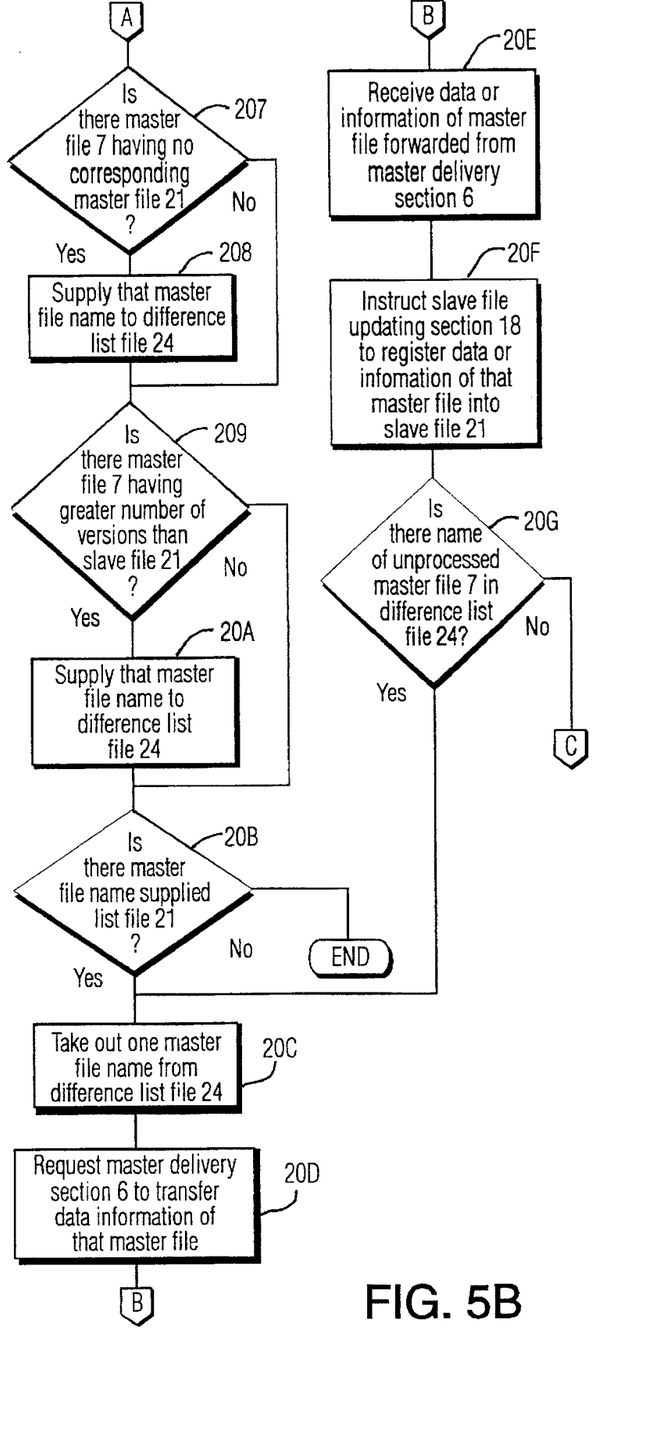

The slave delivery section 20 of the child workstation 3 receives the directory list of the master file 7 forwarded from the delivery start notifying section 5 (step 201), and saves that directory list into the master list file 23 (step 202).

Then the slave delivery section 20 saves the directory list of the slave file 21 into the slave list file 22 (step 203).

The slave delivery section 20 judges whether or not master files corresponding to slave files 21 present in the directory, list of the slave file 22 exist in the directory list of the master list file 23 (step 204); if there is any slave file 21 having no counterpart among the master files 7, instructs the slave file updating section 18 to delete that slave file 21 (step 205); and further deletes information on that slave file 21 in the slave list file 22 (step 206).

Figure 6A:
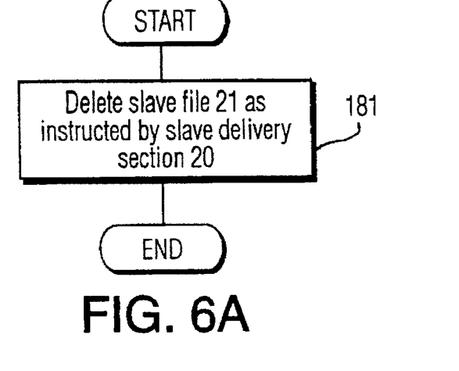
FIGS. 6A–6C are flow charts showing the processing by the slave file updating section 18 and the master delivery section 6 according to an embodiment of the invention.
Figure 6B:
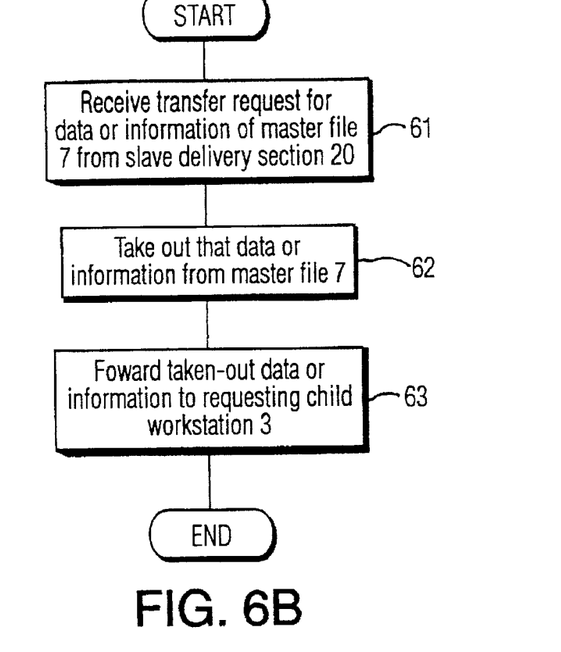
Figure 6C:
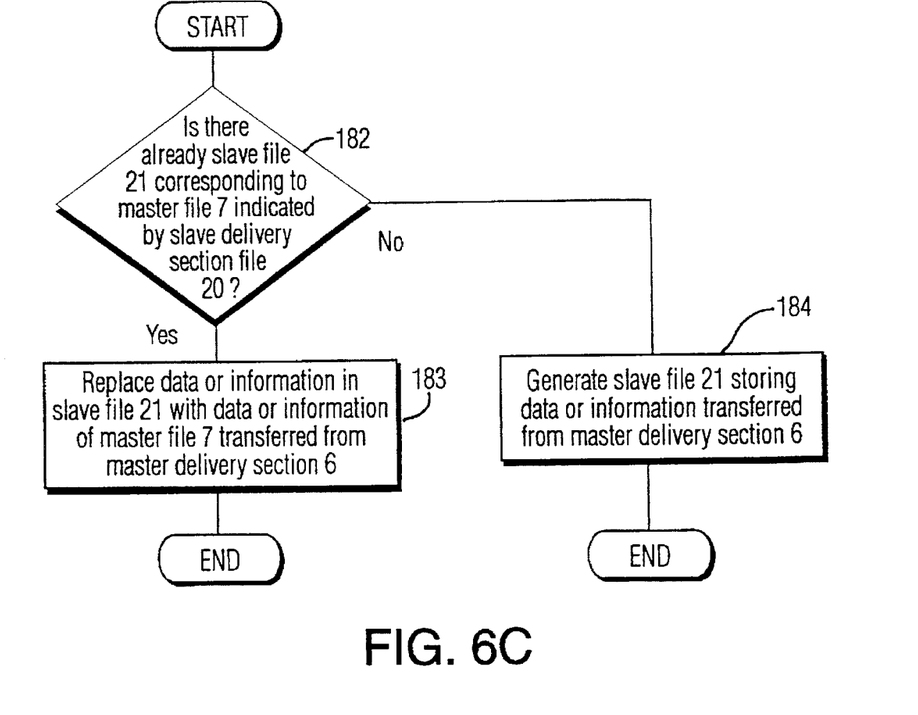

The slave file updating section 18, having been instructed at step 205 by the slave delivery section 20 to delete a slave file 21, deletes that slave file 21 (step 181).

If it is judged at step 204 that every mast file 7 corresponding to a slave file 21 present in the directory list of the slave list file 22 exists in the directory list of the master list file 23 or, if it is checked after the completion of step 206 whether every slave file 21 having its counterpart among the master files 7 present in the directory list of the master list file 23 (step 207) and any master file 7 having no corresponding slave file 21 is found to exist, the slave delivery section 20 supplies the name of that master file 7 to the difference list file 24 (step 208).

If it is judged at step 207 that every slave file 21 corresponding to a master file 7 present in the directory list of the master list file 23 exists in the directory list of the slave list file 22 or, if it is checked after the completion of step 208, with respect to every corresponding pair of a master file 7 and a slave file 21 in the master list file 23 and the slave list file 22, respectively, whether or not there is any master file 7 having a greater number of versions than the corresponding slave file 21 (step 209) and such a master file 7 is found to exist, the slave delivery section 20 supplies the name of that master file 7 to the difference list file 24 (step 20A).

If it is judged at step 209 that there is no master file 7 having a greater number of versions than the corresponding slave file 21 or, if it is check whether or not the name of any master file 7 has been supplied to the difference list file 24 (step 20B) and the name of a master file 7 is found to have been supplied, the slave delivery section 20 takes out the name of that master file 7, or one of them if the names of more than one such master file 7 have been supplied (step 20C), and requests the master delivery section 6 to transfer data or information of that master file 7, using as key the name of that master file 7 (step 20D). The slave delivery section 20, if it is judged at step 20B that the name of any master file 7 has been supplied, completes its processing.

The master delivery section 6 of the parent workstation 1 receives from the slave delivery section 20 the request to transfer data or information of the master file 7 (step 61), takes out that data or information from the master file 7 (step 62), and forwards to the requesting child workstation 3 the data or information taken out of the master file 7 (step 63).

Upon receiving the data or information of the master file 7 forwarded from the master delivery section 6 (step 20E), the slave delivery section 20 instructs the slave file updating section 18 to register the data or information of that master file 7 into a slave file 21 (step 20F).

The slave file updating section 18 judges whether or not there already exists the slave file 21 corresponding to the master file 7, for which registration has been instructed by the slave delivery section 20 (step 182) and, if it does, replaces the data or information in that slave file 21 with the data or information of the master file transferred from the master delivery section 6 (step 183) or, if it does not, generates a slave file 21 in which the data or information transferred from the master delivery section 6 is stored (step 184). As file information including the number of file versions is updated in the processing to update the file at step 183 as in a commonplace procedure of file management, no detailed description of this processing will be made with respect to this embodiment.

The slave delivery section 20, after step 20F, judges whether or not there remains the name of any unprocessed master file 7 in the difference list file 24 (step 20G) and if it does, returns to step 20C.

The slave delivery section 20, if it judges at step 20G that the name of any unprocessed master file 7 no longer remains, returns to step 203.

The foregoing sequence of processing makes the contents of every master file 7 identical with those of the corresponding slave file 21.

Thus is completed the processing by the automatic delivery system for master files in a distributed processing system, which is a preferred embodiment of the present invention.

The above-described embodiment concerns an example of distributed processing system in which the slave files 14 and 21 of the master files 7 of the parent workstation 1 are allocated to two levels including the child workstations 2 and 3, respectively.

It is obvious that, if slave files of the slave files 14 of the child workstation 2 or of the slave files 21 of the child workstation 3 are set in the grandchild workstations 25, the invention can be applied to the relationships between the respective child workstations and the grandchild workstations.

Thus it is also obvious that the invention is applicable not only to such two-level distributed processing systems comprising parent and child workstations as described above, but also to distributed processing systems of more than two levels, e.g. three-level distributed processing systems consisting of parent, child and grandchild workstations.

As hitherto described, a characteristic feature of the invention consists in that, when the updated asset registering section of a child workstation forwards to the parent workstation the data or information of a slave file updated by the slave file updating section, the master file updating section of the parent workstation registers the forwarded data or information into a master file, and the delivery start notifying section forwards the directory list of the master file to the child workstation. Another feature consists in that the slave delivery section of the child workstation, having received the directory list of this master file, compares that directory list and the directory list of the slave file; requests the master delivery section of the parent workstation to forward any data or information in the file which is found different; and causes the slave file updating section to save into the slave file the data or information having been received in response to the request.

Because of these features, the invention has the benefit of always ensuring the appropriateness of the environment of program development in a distributed processing system.

The invention has another benefit of providing a distributed processing system which keeps the contents of the master files of the parent workstation always identical with those of the slave files of child workstations, and thereby enables the users of child workstations to use the stations without being conscious of the updating history of the slave files.

The invention has still another benefit of providing a distributed processing system excelling in the efficiency of line utilization because only newly registered or updated contents are transferred from master files to slave files.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. An automatic delivery system for master files in a distributed processing system comprising a parent workstation provided with master files for storing data or information to be shared within said distributed processing system; child workstations connected by communication lines to the parent workstation and provided with slave files for storing data or information acquired from said master files; and grandchild workstations, connected by communication lines to the child workstations, for utilizing data or information in said slave files to execute business processing, wherein said parent workstation comprises a master file updating section, a delivery start notifying section, and a master delivery section;

the master file updating section comprising means for updating said master files with data or information forwarded from said child workstations;

the delivery start notifying section comprising means for forwarding directory lists of said master files to said child workstations;

the master delivery section comprising means for removing data or information requested by said child workstations from said master files, and means for forwarding said requested data or information to said child workstations;

and wherein each of said child workstations comprises a slave file updating section, an updated asset registering section, and a slave delivery section;

the slave file updating section comprising means for updating said slave files;

the updated asset registering section comprising means for forwarding to said parent workstation data or information in said slave files upon updating by the slave file updating section; and the slave delivery section comprising means for comparing a content of the directory list of said master files forwarded by said parent workstation with a content of the directory lists of said slave files, means for requesting said parent workstation to forward the data or information in said master files which is found to be different, and means for instructing said slave file updating section to update said slave files with the data or information received in response to the request.

2. An automatic delivery system for master files in a distributed processing system comprising a parent workstation provided with master files for storing data or information to be shared within said distributed processing system; child workstations connected by communication lines to the parent workstation and provided with slave files for storing data or information acquired from said master files; and grandchild workstations, connected by communication lines to the child workstations, for utilizing data or information in said slave files to execute business processing, wherein said parent workstation comprises a master file updating section, and operation setting file, a group list file, a master list file, a delivery start notifying section and a master delivery section;

the master file updating section comprising means for updating said master files with data or information forwarded from said child workstations;

the operation setting file containing points of time at which directory information in said master files is to be forwarded to any child workstation;

the group list file containing information relative to which of said child workstations said directory information in said master files is to be forwarded;

the master list file containing a directory list of said master files;

the delivery start notifying section comprising means for forwarding the directory list of said master files stored in the master list file to one of said child workstations designated in said group list file at a point of time designated in said operation setting file;

the master delivery section comprising means for removing data or information requested by said child workstations from said master files, and means for forwarding said requested data or information to said child workstations;

and wherein each of said child workstations comprises a slave file updating section, an updated asset registering section, a master list file, a slave list file, a difference list file, and a slave delivery section;

the slave file updating section comprising means for updating said slave files;

the updated asset registering section comprising means for forwarding to said parent workstation data or information in said slave files upon updating by the slave file updating section;

the master list file containing said directory list of said master files forwarded from said parent workstation;

the slave list file containing a directory list of said child workstation's own slave files; and the slave delivery section comprising means for comparing a content of the directory list of said master files forwarded by said parent workstation with a content of the slave list file, means for saving a name of any master file which is found to be different into the difference list file, means for requesting said parent workstation to forward the requested data or information in said different master file, and means for instructing said slave file updating section to update said slave files with the data or information received in response to the request.

3. An automatic delivery system as claimed in claim 2, wherein said system comprises means for storing in said master list file and said slave list files at least names of files and number of versions as directory lists.

* * * * *